United States Patent [19]

Houser et al.

[11] Patent Number: 5,003,628

[45] Date of Patent: Mar. 26, 1991

[54] VARIABLE SPEED D.C. MOTOR CONTROL

[75] Inventors: John Houser, Stow; Gary Loughner, Cleveland, both of Ohio

[73] Assignee: Lucerne Products, Inc., Hudson, Ohio

[21] Appl. No.: 317,901

[22] Filed: Mar. 2, 1989

[51] Int. Cl.[5] .............................................. G05B 5/00
[52] U.S. Cl. ................................... 388/815; 388/824; 388/822; 388/910
[58] Field of Search ............................ 388/809-815, 388/816-821, 803-804, 806-807, 822-824, 915, 910

[56] References Cited

U.S. PATENT DOCUMENTS

| | | | |
|---|---|---|---|
| 3,458,791 | 7/1966 | Boice | 388/824 |
| 3,649,897 | 3/1972 | Messick | 388/815 X |
| 3,887,855 | 6/1975 | Klimo | 388/807 |
| 3,931,558 | 1/1976 | Houser | 388/830 |
| 3,935,522 | 1/1976 | Tsay | 388/830 |
| 3,950,683 | 4/1976 | Lamson | 388/807 |
| 4,275,342 | 6/1981 | Kawoda et al. | 388/815 |
| 4,420,700 | 5/1981 | Fay et al. | |
| 4,458,183 | 7/1984 | Neilson | 388/815 X |
| 4,517,501 | 5/1985 | Takimoto | 388/815 X |
| 4,555,082 | 5/1984 | Nesler | |
| 4,673,851 | 6/1987 | Disser | 388/831 |
| 4,675,588 | 6/1987 | Talbot | 388/811 |
| 4,680,517 | 7/1987 | Fujioka | 388/824 X |
| 4,694,228 | 7/1987 | Michaelis | 388/819 |
| 4,705,997 | 11/1987 | Juzswik | 388/811 |
| 4,833,379 | 5/1987 | Kaibel et al. | 388/811 |

OTHER PUBLICATIONS

"Triangle/Square Wave Oscillator" Article appearing in Modern Electronics Magazine, May 1987.

Primary Examiner—William M. Shoop, Jr.
Assistant Examiner—David Martin
Attorney, Agent, or Firm—D. Peter Hochberg; Mark Kusner; Louis J. Weisz

[57] ABSTRACT

A manually operated switch lever moves arm 105 along resistor 113 to generate a "raw" motor speed demand signal which is amplified and inverted by amplifiers 115 and 119 to form a "base line" demand signal.

The "raw" demand signal and a motor load signal at the output of amplifier 154 are compared in amplifier 125 to generate an "error" signal. The "error" signal and the "base line" demand signal are summed in amplifier 129 to form a variable reference voltage which is applied to the non-inverting input of comparator 132. The second input to comparator 132 is a triangular shaped wave which is centered about V/2. When the amplitude of the oscillator output wave exceeds the reference voltage, the output of the comparator 132 is low and switch 160 is off. Thus, variations in the D.C. reference voltage at the output of amplifier 129 control the ON-off duty cycle of MOSFET switch 160 to adjust the power applied to motor 106.

9 Claims, 2 Drawing Sheets

VARIABLE SPEED D.C. MOTOR CONTROL

TECHNICAL FIELD

This invention relates to the control of speed of battery operated D.C. motors.

BACKGROUND OF THE INVENTION

With the advent of relatively small rechargeable dry batteries, and generally longer life dry batteries, battery operated portable hand held appliances which include both operator control of motor speed and substantial variation in motor load e.g., drills, routers, screwdrivers, etc., have been developed and widely used. User satisfaction demands that portable appliances be responsive to operator and provide consistent, reproducible results so long as the battery source has a usable level of charge at the time of use. Additionally, motor control circuitry for portable applications must have a reasonably long service life; must not be wasteful of power; and must be cost effective.

Early battery operated appliances rely heavily on mechanical switches and variable resistances to achieve motor control. While such devices are generally reliable, they tend to be unresponsive to changes in motor load, and they tend to dissipate excessive amounts of power in the control circuitry.

Some power tools have used tachometers to monitor speed and provide feedback control signals; such arrangements are both costly and bulky.

DISCLOSURE OF THE INVENTION

In accordance with an aspect of the present invention, power MOSFET transistors are employed to control application of power to a D.C. motor; and operator speed demand input signals and signals representative of motor load are processed to generate an operating point reference signal which floats with operator demand for speed.

In accordance with another aspect of this invention, power level control circuitry, which includes a triangular wave, fixed frequency oscillator and level comparator circuitry, generates power On and Off signals for control of the gate of the MOSFET power devices in accordance with the operating point reference signal.

In accordance with a further aspect of the invention, MOSFET power switches, which supply power to a motor, are slowly turned on and turned off to protect the power switches against large transient signals which occur when power is abruptly removed from a motor.

THE DRAWING

DETAILED DESCRIPTION

Figure 1:
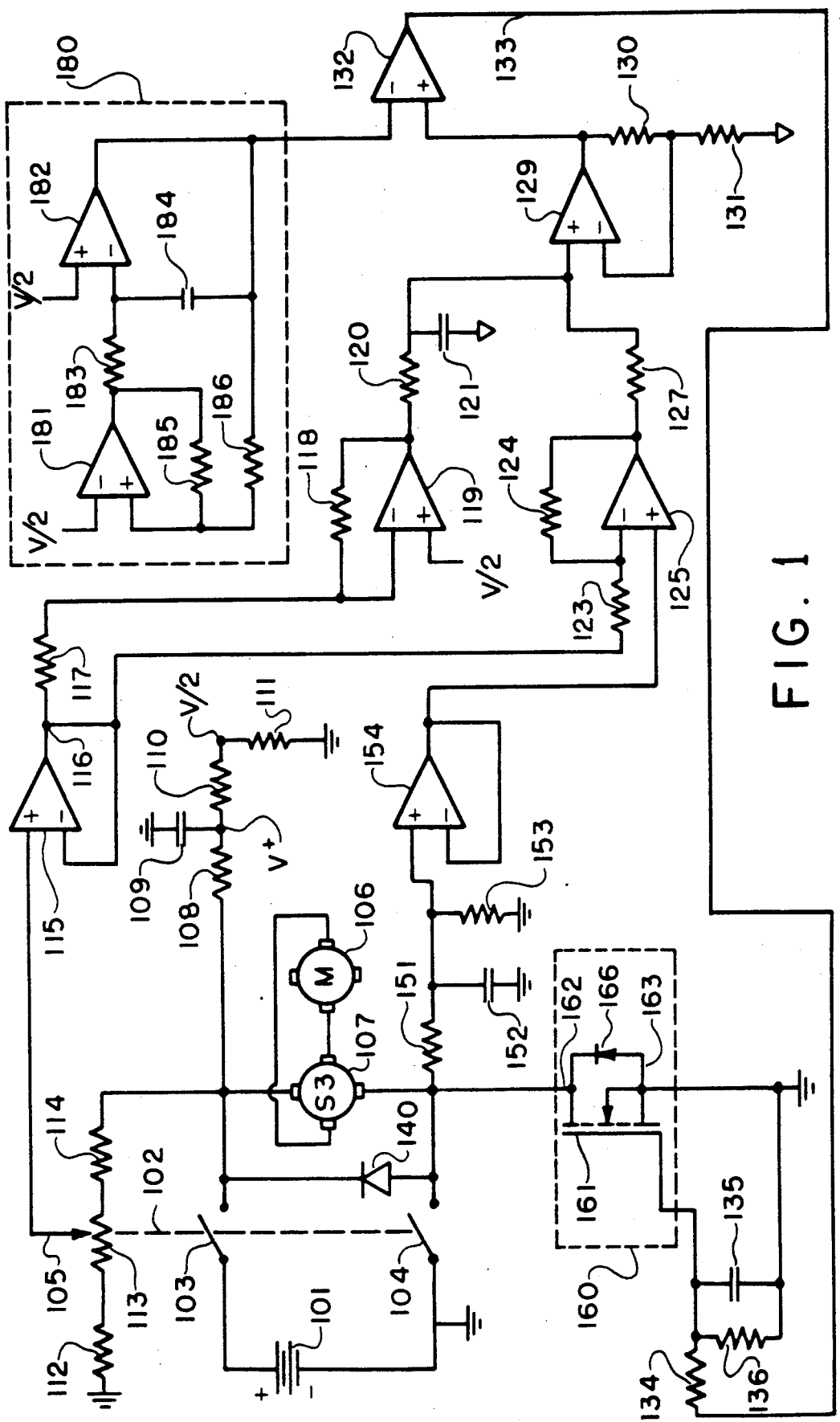
FIG. 1 is schematic diagram of an illustrative embodiment of the invention.

A variable speed motor control circuit in accordance with the present invention is shown in schematic form in FIG. 1.

The motor 106 and the associated control circuitry are intended for use in a battery operated portable tool e.g., a drill, screwdriver, etc., which is to operate from battery 101. The voltage of the battery is selected to match the intended application of the motor.

Operating potentials V+ and V/2 are derived from the filter circuit composed of resistor 108 and capacitor 109, and from the voltage divider composed of resistors 110 and 111.

Switch 107 is a manually operated reversing switch to reverse the operating direction of the motor. Diode 140 is employed to dissipate energy stored in the motor when power is abruptly removed. The operator manual switch assembly 102 has a switch lever which is not shown in the drawing and three related functional components, namely: switch 103 which connects the battery to the motor control circuit when the operator first depresses the switch lever; resistance arm 105 which slides along resistor 113 from a high voltage value to a low voltage value as the lever is depressed by an operator to request an increase in motor speed; and switch 104 which overrides the operation of the motor control circuitry when the switch lever is fully depressed. Switch 103, resistance arm 105 and switch 104 operate sequentially as the operator lever is depressed.

The operator demand signal at arm 105 is electrically treated in voltage follower amplifier 115. The signal at the output of amplifier 115 is a "raw" demand signal which is employed as follows: (a) the demand signal is inverted by inverting amplifier 119 and filtered by series resistor 120 and shunt capacitor 121 to provide a "base line" demand input signal to the non-inverting input of summing amplifier 129; and (b) the demand signal is compared, in amplifier 125, to a "motor load" signal which is directly related to motor load in order to generate an error signal which is a second input signal to the non-inverting input of summing amplifier 129.

The motor load signal is available at the junction of resistor 151 and the parallel network of capacitor 152 and resistor 153 when the MOSFET switch 160 is off and switch 104 is open. The motor load signal is the difference between the voltage battery supply voltage V+ and the back EMF generated by the rotation of the motor. The back EMF signal is essentially a D.C. signal with motor commutator noise. When switch 103 is first closed, the motor is at rest or just starting to move and the back EMF signal is zero or very low. Accordingly, at start-up, as measured across capacitor 152, the motor load signal is at or near the voltage V+. As the motor rotates and picks up speed, the back EMF increases and the value of the motor load signal decreases. As time progresses, the motor load signal rises or falls as the load respectively increases or decreases.

The signal at the output of amplifier 125, which is the difference between the operator demand signal and the motor load signal, forms the "error" signal input to non-inverting input terminal of summing amplifier 129.

In some applications it may be desirable to decrease the magnitude of the error signal. This is done by resistor 153 which forms a voltage divider with resistor 151, decreasing the magnitude of the motor demand signal across capacitor 152. For those applications where a maximum error signal is desired resistor 153 is not required.

The signal at the output of summing amplifier 129, which is the sum of the base line demand signal and the error signal, indicates if the motor speed is above, at or below the speed defined by the base line demand signal. The signal at the output of difference amplifier 125 is a nominal value when the current motor speed equals the base line demand signal. As the motor speed increases or decreases from the base line demand value, the output of difference amplifier 125 changes by a reverse relationship, that is decreases or increases accordingly.

The output of summing amplifier 129 proportionally follows the output of difference amplifier 125 in order to correct the motor speed error relative to he base line demand signal. The output of summing amplifier 129 will control an increase or decrease of power to motor 106 as changing motor load causes a decrease or increase, respectively, of motor speed.

The voltage at the output of amplifier 129 is employed as a variable reference voltage for comparator 132. The reference voltage is low for low demand signals and for low motor load signals.

The second input to comparator 132 is a triangular shaped wave from the oscillator 180 formed of amplifiers 181 and 182; resistors 183, 185 and 186; and capacitor 184. The triangular output wave is always positive with respect to battery ground and is centered about voltage V/2. When the amplitude of the oscillator output wave exceeds the reference voltage, the output of the comparator 132 is low and MOSFET switch 160 is off. Variation in the d.c. reference voltage controls the ON-OFF duty cycle of MOSFET switch 160 to control the level of power applied to the motor. The comparator 132 is an operational amplifier without feedback. Accordingly, the output is always fully On or Off and the output signal is a rectangular wave.

Figure 2:
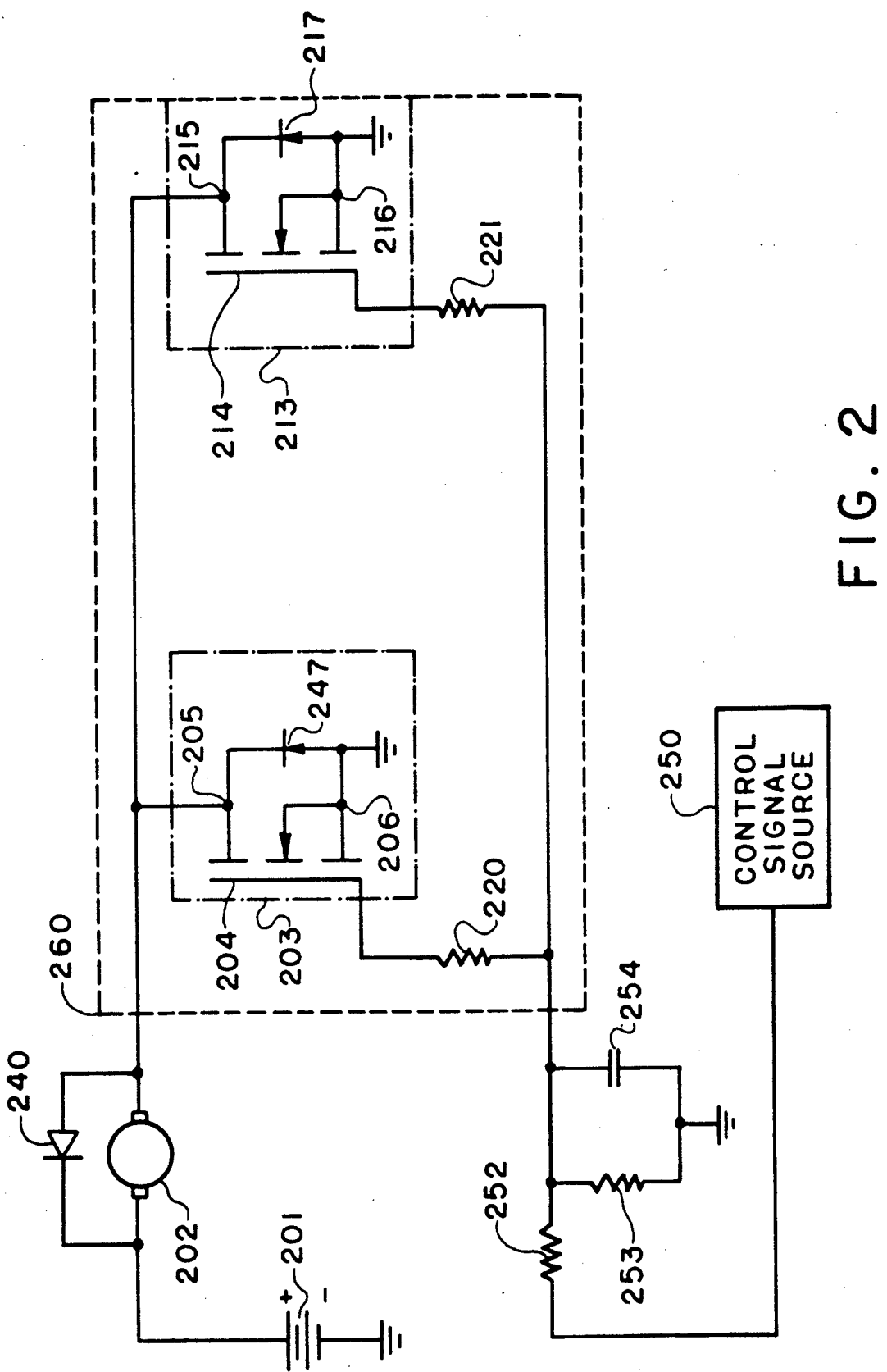
FIG. 2 is a schematic diagram of a power switch assembly.

In the illustrative embodiment, the switch assembly 160 comprises one MOSFET switch to connect power to motor 106. FIG. 2 illustrates a switch assembly 260 which comprises a plurality of MOSFET switches operated in parallel. The number of MOSFET switches employed in an application is dependent upon motor size and current carrying capacity of the MOSFET switch.

The power switch assembly 260 of FIG. 2 illustrates the use of two MOSFET switches 203 and 213 operated in parallel. The use of two switches is for the purpose of illustration only. Additional switches may be connected in parallel with switches 203 and 213 to meet demand for further current capacity. When more than one MOSFET switch is used, decoupling resistors e.g., resistors 220 and 221, one for the gate of each switch of the assembly, are employed to prevent parasitic oscillations. Such oscillations may occur because of the high capacitance of the MOSFET gates. Uncontrolled parasitic oscillations can result in reduced switch efficiency or in damage to the MOSFET switches.

In FIG. 1, the RC integrating circuit comprised of series resistor 134, voltage divider shunt resistor 136 and shunt capacitor 135 reduces the rise and fall times of the rectangular wave signal from the output of comparator 132. Modification of the drive signal slows down both the turn on and turn off of MOSFET Switch 160. During the off cycle of switch 160 diode 140 can conduct before the energy stored in the inductance of motor 106 is converted to a voltage transient which can damage the MOSFET structure. Energy stored in the motor is dissipated when diode 140 is conducting. In FIG. 2 resistors 252 and 253, capacitor 254 and diode 240 provide the same protection function for MOSFET Switches 203 and 213, as well as any others that may be added.

The invention has been described with particular attention to its preferred embodiment; however, it should be understood that variations and modifications within the spirit and scope of the invention may occur to those skilled in the art to which the invention pertains.

What is claimed is:

1. A motor control assembly for controlling the speed of a D.C. motor comprising:
   first and second source terminals for connection to a D.C. source of power;
   first and second motor terminals for connection to a motor to be controlled;
   a manually operated control for generating motor speed demand signals; means for generating motor load signals; comparison means responsive to said speed demand signals and to said motor load signals for generating error signals;
   summing means comprising: an output terminal, means coupled to and responsive to said speed demand signals and to said error signals for generating power level reference signals at said summing means output terminals;
   power switching means connected in series with said motor terminals and responsive to power control signals for selectively applying power from a source of power connected to said power terminals to said motor terminals; and
   power control means responsive to said power level reference signals for generating said power control signals.

2. A motor control assembly for controlling the speed of a D.C. motor according to claim 1, wherein:
   said summing means comprises an operational amplifier comprising: and output terminal; an inverting input terminal coupled to a potential source; a non-inverting input terminal; first summing resistor means for coupling said error signals to said non-inverting input terminal; and means for coupling said speed demand signals to said non-inverting input terminal comprising: a signal inverting operational amplifier connected in series with second summing resistor means.

3. A motor control assembly for controlling the speed of a D.C. motor according to claim 1, wherein:
   said power switching means comprises: a MOSFET switch comprising source and drain terminals connected in series with said motor terminals; a gate terminal responsive to said power control signals to turn said switch on and off; and means for coupling said gate terminal to said power control means.

4. A motor control assembly for controlling the speed of the D.C. motor according to claim 3, wherein:
   said power switching means comprises protection means connected in parallel with said motor protecting said MOSFET switch.

5. A motor control assembly for controlling the speed of a D.C. motor according to claim 4, wherein:
   said power switching means comprises a plurality of MOSFET switches connected to operate in parallel with one and another.

6. A motor control assembly for controlling the speed of a D.C. motor according to claim 5, wherein:
   the gate terminals of said plurality of MOSFET switches are individually coupled to said power control means by a corresponding plurality of resistors.

7. A motor control assembly for controlling the speed of a D.C. motor according to claim 1, wherein:
   said power control means comprises: oscillator means for generating a sequence of repeating triangular shaped signals at an output terminal thereof; and a switching amplifier comprising; a first input terminal coupled to said output terminal of said summing means, a second input terminal coupled to said output terminal of said oscillator, an output terminal, and means responsive to signals applied to said first and second input terminals for generating said power control signals at said amplifier output terminal.

8. A motor control assembly for controlling the speed of a D.C. motor according to claim 1, wherein:
said power switching means comprises: MOSFET switching means comprising: source and drain terminals connected in series with said power source terminals and said motor terminals, and a gate terminal for turning said switch on and off in accordance with said power control signals; and
said system further comprises: integrating circuit means for coupling said power control signals to said gate terminal.

9. The combination in accordance with claim 8, wherein: said integrating means comprises a series connected resistor and a shunt capacitor.

* * * * *